(12) United States Patent
Razzano

(10) Patent No.: US 9,366,329 B2
(45) Date of Patent: Jun. 14, 2016

(54) CHAIN DRIVE AND TIMING ASSEMBLY OF AN INTERNAL COMBUSTION ENGINE HAVING SUCH CHAIN DRIVE

(71) Applicant: I.C.P. S.r.I., Castelnuovo Don Bosco (IT)

(72) Inventor: Tancredi Razzano, Piova'Massaia (IT)

(73) Assignee: I.C.P. S.r.l. (IT)

( * ) Notice: Subject to any disclaimer, the term of this patent is extended or adjusted under 35 U.S.C. 154(b) by 246 days.

(21) Appl. No.: 14/057,790

(22) Filed: Oct. 18, 2013

(65) Prior Publication Data

US 2014/0113754 A1    Apr. 24, 2014

(30) Foreign Application Priority Data

Oct. 19, 2012 (IT) ................ TO2012A0920

(51) Int. Cl.
| | |
|---|---|
| *F16H 57/01* | (2012.01) |
| *F16H 7/08* | (2006.01) |
| *G01M 13/02* | (2006.01) |
| *F02B 77/08* | (2006.01) |

(52) U.S. Cl.
CPC .............. *F16H 57/01* (2013.01); *F02B 77/081* (2013.01); *F16H 7/08* (2013.01); *G01M 13/023* (2013.01); *F16H 2007/0872* (2013.01); *F16H 2057/014* (2013.01)

(58) Field of Classification Search
CPC ............... F02B 77/81; G01M 13/023; F16H 2057/0872; F16H 2057/014; F16H 57/01; F16H 7/08
USPC .......... 474/109, 110, 111, 148, 206; 123/90.27, 90.31; 340/438
See application file for complete search history.

(56) References Cited

U.S. PATENT DOCUMENTS

| | | | | |
|---|---|---|---|---|
| 6,181,239 | B1 * | 1/2001 | Ahmed | F02B 77/081 |
| | | | | 340/438 |
| 6,564,909 | B1 * | 5/2003 | Razzano | G01B 7/06 |
| | | | | 116/208 |
| 6,609,985 | B2 * | 8/2003 | Todd | F16H 7/0829 |
| | | | | 474/103 |
| 8,387,244 | B2 * | 3/2013 | Markley | F01L 1/022 |
| | | | | 123/90.31 |
| 9,032,926 | B2 * | 5/2015 | Kato | F16H 7/18 |
| | | | | 123/90.27 |
| 2002/0025870 | A1 | 2/2002 | Kozakura | |
| 2005/0161310 | A1 * | 7/2005 | Muller | D06F 58/08 |
| | | | | 200/80 R |
| 2009/0143177 | A1 * | 6/2009 | Nakano | F01L 1/02 |
| | | | | 474/109 |
| 2013/0131899 | A1 * | 5/2013 | Jung | B60W 20/50 |
| | | | | 701/22 |
| 2015/0126330 | A1 * | 5/2015 | Ries | F16H 57/01 |
| | | | | 477/94 |

FOREIGN PATENT DOCUMENTS

| | | |
|---|---|---|
| DE | 19503457 | 7/1996 |
| EP | 1052423 | 11/2000 |
| EP | 1310700 | 5/2003 |
| EP | 1978273 | 10/2008 |
| WO | WO2008019205 | 2/2008 |

* cited by examiner

*Primary Examiner* — William E Dondero
*Assistant Examiner* — Robert T Reese
(74) *Attorney, Agent, or Firm* — The Belles Group, P.C.

(57) ABSTRACT

In a chain drive, the wear of a chain having a plurality of links, each of which is provided with a pair of pivot pins parallel to each other and transversally spaced apart from each other and at least three strips parallel to one another and arranged side by side is controlled by means of a detection device adapted to detect the breakage of at least one of the strips and to emit a signal indicating to replace the chain itself.

13 Claims, 4 Drawing Sheets

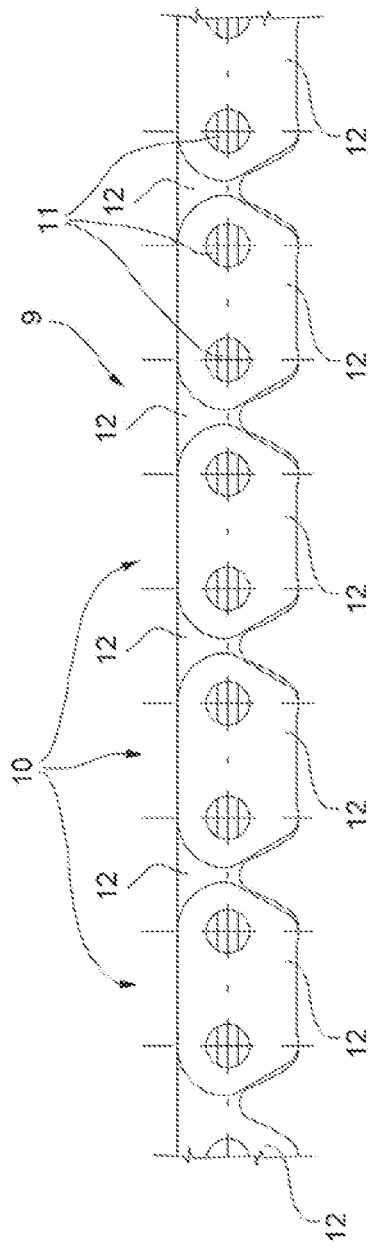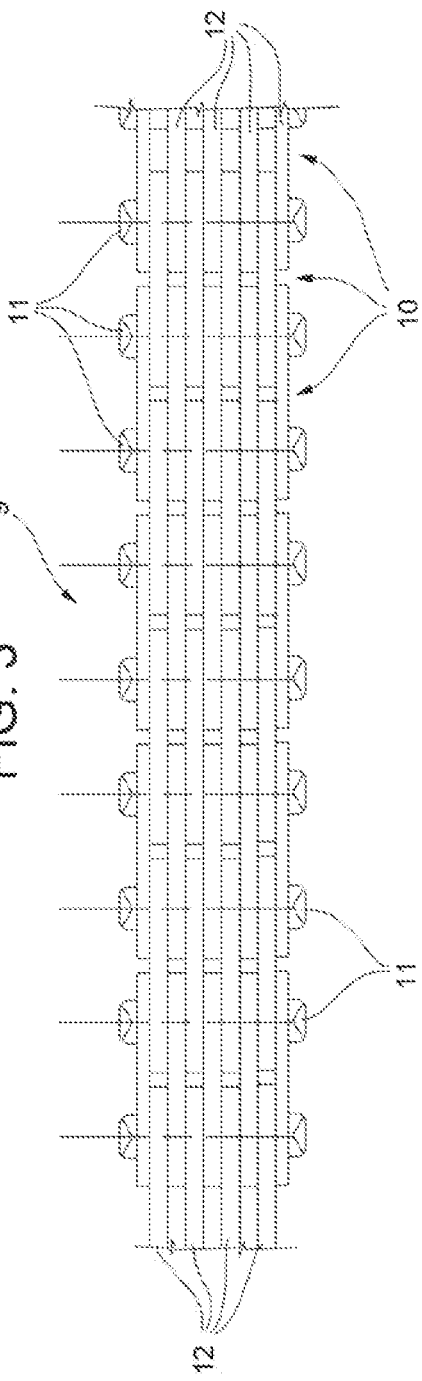

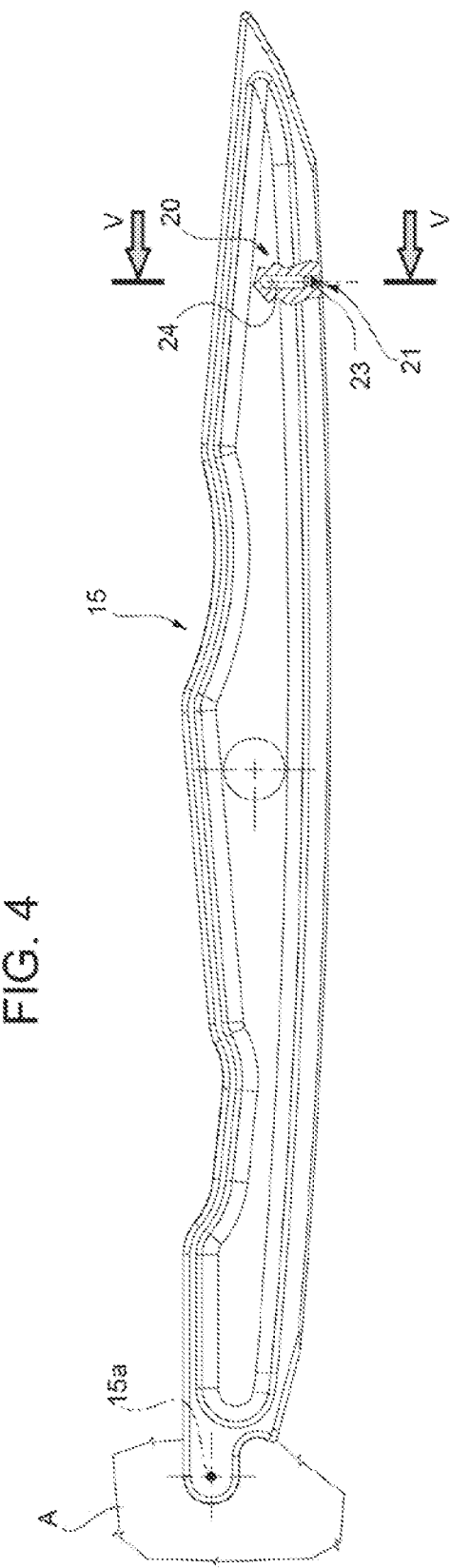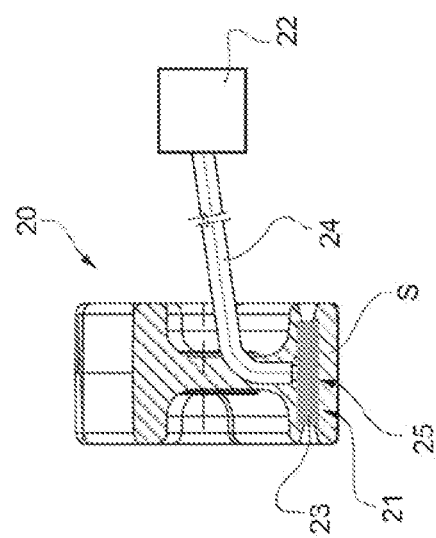

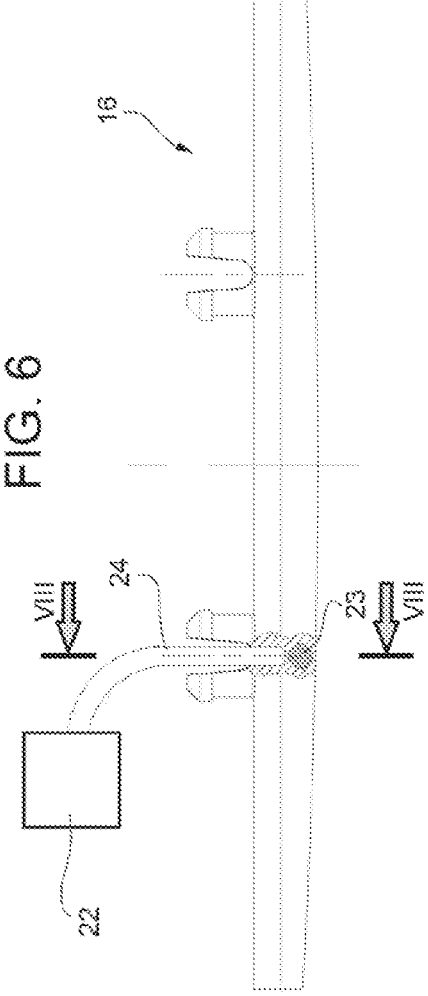
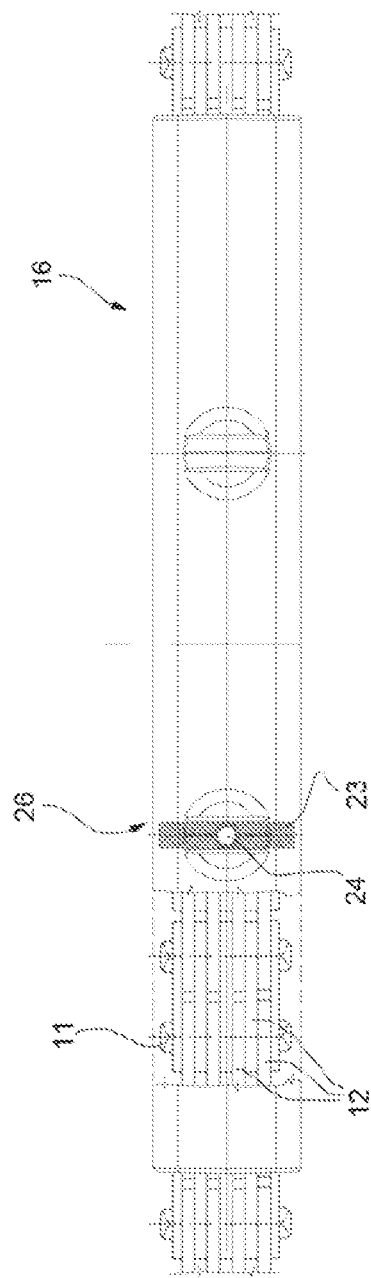
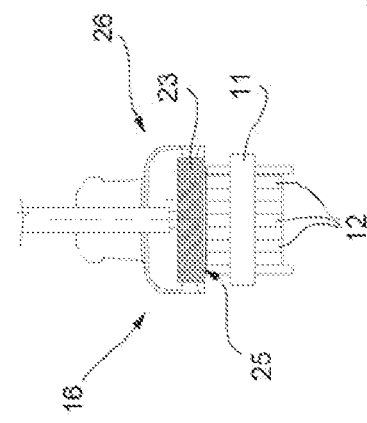

CHAIN DRIVE AND TIMING ASSEMBLY OF AN INTERNAL COMBUSTION ENGINE HAVING SUCH CHAIN DRIVE

CROSS-REFERENCE TO RELATED APPLICATIONS

This application claims the benefit of Italian Patent Application No. TO2012A 000920, filed Oct. 19, 2012, the entirety of which is hereby incorporated by reference.

FIELD OF THE INVENTION

The present invention relates to a chain drive. In particular, the present invention relates to a chain drive, which is advantageously but not exclusively applied to internal combustion engines, e.g. for aeronautic applications, for making a timing assembly.

BACKGROUND OF THE INVENTION

In the field of internal combustion engines it is known to use fuel intake valves and combustion product exhaust valves, the opening/closing of which is controlled by camshafts actuated by a mechanical chain drive.

The chains are components subject to high stress and continuous progressive wear, which often cause sudden breakage of the chain. Chain breakage must be absolutely avoided to preventive irreparable damage to the engine. For this reason, the known drives of the type described above undergo preventive maintenance which requires replacing the chains after a predetermined time of operation regardless of whether the chains themselves have reached the end of their working life or not.

The scheduled replacement of the chains implies inevitable, long machine downtime and high replacement costs.

SUMMARY OF THE INVENTION

It is the object of the present invention to make a chain drive, the manufacturing features of which allow to eliminate preventive maintenance operations and in particular, allow to use the chain until a limit wear condition is reached.

According to the present invention a chain drive is made comprising a driving sprocket, at least one driven sprocket and an endless chain wound around said driving, and driven sprockets and comprising a plurality of links; each of said link comprising two pivot pins parallel and transversely spaced apart from each other and at least three strips extending between said two pivot pins and having opposite end portions through which said pivot pins pass, characterized in that it also comprises means for controlling the wear of said chain; said means for controlling wear comprising detector means for detecting the breakage of at least one of said strips and emitter means for sending a signal for replacement of said endless chain in response to a breakage signal received from said detector means.

BRIEF DESCRIPTION OF THE DRAWINGS

The invention will now be described with reference to the accompanying drawings which illustrate a non-limitative embodiment thereof, in which:

FIGS. 2 and 3 show a side elevation view and plan view, respectively, of a drive chain in FIG. 1;

FIG. 4 shows a detail of the drive in FIG. 1;

FIG. 5 shows, on a greatly enlarged scale, a section taken along line V-V in FIG. 4;

FIGS. 6 and 7 show a side elevation view and plan view, respectively, of a further detail of the drive chain in FIG. 1; and FIG. 8 shows, on a greatly enlarged scale, a section taken along line VIII-VIII in FIG. 6.

DETAILED DESCRIPTION OF THE INVENTION

Figure 1:
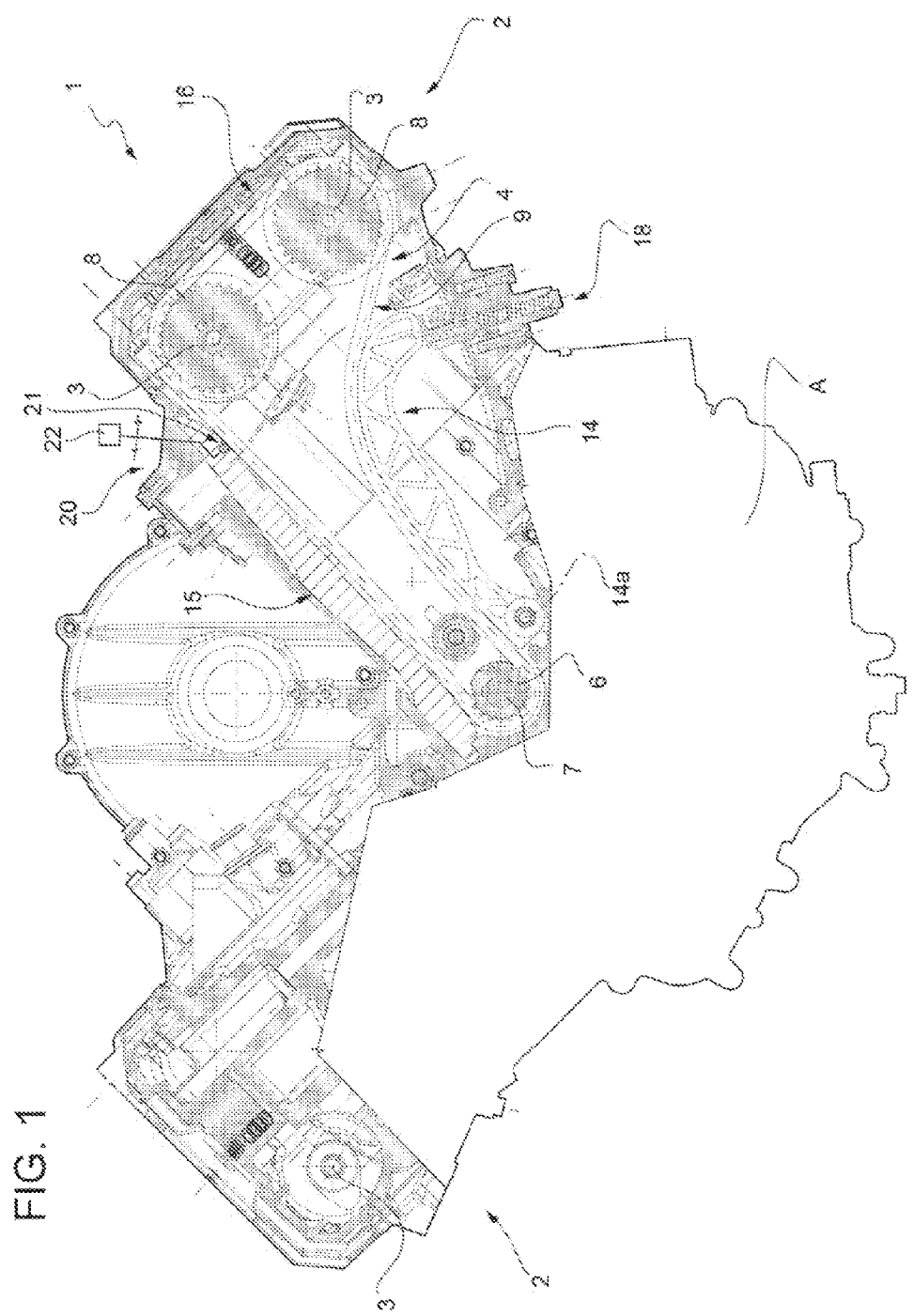
FIG. 1 shows a partial section view of a internal combustion engine provided with a chain timing drive made according to the dictates of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

In FIG. 1, reference numeral 1 indicates as a whole an internal combustion engine, which in the particular example described herein comprises a cylinder block A, two cylinders 2 in a V-arrangement and, for each cylinder 2, a respective pair of camshafts 3 and a respective mechanical chain drive 4 actuated by the shafts 3 themselves, only one of which is shown in FIG. 1.

Each drive 4 comprises a driving, sprocket 6 fitted onto a drive shaft 7, two driven sprockets 8 each fitted onto a respective camshaft 3 and an endless chain 9 wound about the sprockets 6 and 8.

According to a variant (not shown) the engine 1 comprises a single cylinder 2, one only camshaft 3 and thus a single driven sprocket 3 and the chain 9 is therefore wound about only two sprockets.

In both solutions, the chain 9 is of the type with multiple strips arranged side-by-side, and, for example, of the type known with the commercial name of Morse chains.

With reference to FIGS. 2 and 3, the chain 9 comprises a plurality of links 10, each of which comprises, in turn, a pair of pivot pins 11 parallel to each other and transversally spaced apart from each other and a plurality of strips 12 or connecting rods arranged side-by-side orthogonally to the respective pins 11 and between the strips 12 of the adjacent links 10; the strips 12 having opposite terminal portions crossed by respective pivot pins 11.

Again with reference to FIG. 1, the drive 4 further comprises a tensioner shoe 14, a guide shoe 15 arranged along the chain 9 between the driving sprocket 6 and one of the driven sprockets 8 and a reference shoe 16 arranged along the chain 9 between the two driven sprockets 8. The shoe 16 defines a reference for the chain 9 and in the particular described example does not slidingly cooperate with the chain 9 correct tensioning conditions of the chain 9 itself.

The tensioner shoe 14 is conveniently made of plastic material or other electrically insulating material, possibly reinforced, and has an end portion thereof pivoted to the cylinder block A to oscillate about a pivot axis 14a under the bias of a linear actuator 18 known in itself and not described in detail. The shoes 15 and 16 are again made of plastic material or other equivalent electrically insulating material but are coupled to the cylinder block A in intrinsically known manner and in practically fixed positions.

Again with reference to FIG. 1, the drive 4 further comprises a control device 20 for controlling the wear of the chain 9 adapted to detect a start of breakage condition of the chain 9 itself and to send a visual or acoustic signal that the chain 9 must be replaced to avoid malfunctioning and/or damage to engine 1.

In the example shown in FIG. 1, the device 20 is associated to the shoe 15 and comprises a member 21 for detecting, the start of breakage and an emitter device 22 adapted to emit an acoustic or visual warning signal. In the particular described example, the detection member 21 comprises a metal detection portion 23 adapted to cooperate in sliding manner with a broken strip 12 of the chain 9 and an electric wiring 24 to connect the metal portion 23 to the emitter device 22.

According to a preferred embodiment, the metal portion 23 is defined by an elongated body, conveniently a pin arranged parallel to the pins 11 or a plate body essentially parallel to the pins 11 themselves.

According to a variant, the metal portion 23 is defined by two or more pins arranged as a comb.

According to a further variant, the metal portion 23 consists of a metal mesh or braid or link of metal wires or other equivalent conducting materials, e.g. graphite.

Regardless of the embodiment of the metal portion 23, the same metal portion 23 is completely housed in an electrically insulating portion of the shoe 16 and conveniently completely embedded in the electrically insulating portion so as to be protected from external agents or contaminants (FIG. 5). Conveniently, in such a solution, the side surface 25 of the metal portion 23 facing the chain 9 is protected by a layer S of electrically insulating material and is adapted to be partially removed or cut by a broken strip 12 of the chain 9.

According to a variant, the metal portion 23 is only partially embedded in the electrically insulating portion of the shoe 15 so that the outer side surface 25 is at least partially uncovered.

With reference to figures from 6 to 8, the drive 4 further comprises a further control device 26 for controlling the wear of the chain associated to the shoe 16 either in addition to or instead of the device 20. The device 26 is identical to device 20 from the point of view of construction.

According to a further variant, the device 20 is associated to the shoe 14.

According to a further variant (not shown), the device 20 is not carried by the shoes 14-16, but forms part of a wear sensor, which comprises an attachment body to a fixed body, e.g. the cylinder block A and a block of electrically insulating material, in which the respective metal portion 23 is at least partially housed. The sensor carries an electrical wiring adapted to be coupled to an emitter block 22.

It has been experimentally found that the end of the working life of the chain 9 is manifested by the breakage of one of the strips 12 into two pieces, which during the movement of the chain tend to turn about the respective pin 11 with respect to the strips which are still intact. Consequently, as soon as one of the strips 12 breaks it inevitably cuts the insulating material lining (where present) or comes into contact with the metal portion 23. Having reached the metal portion 23, the contact portion with or the shearing or the metal portion 23 causes the activation of the emitter device 22 and warns the operator of the need to immediately replace the chain 9.

From the above it is thus apparent that the presence of at least one of the devices 20,26 allows to avoid periodical checks or scheduled replacements, with consequent reduction of costs in terms of manpower and materials. Indeed, the chain 9 does not need to be checked or replaced after a predetermined number of hours of operation regardless of its state of wear but only when the first signs of failure appear. In other words, the working life of the chain is extended to the reaching of a limit operating condition.

From the above, it is then apparent that the presence of several devices for controlling the wear of the chain arranged in different points of the path of the chain itself allows to detect the beginning of breakage immediately because the broken strip turns with respect to the other intact strips in different manner according to the geometry of the path and thus the curvature of the chain. With this regard, it is apparent that the detection device or devices 20,26 may be arranged in different points from that shown by way of example, and in particular near or at the sprockets. This is possible because the metal portion constitutes part of a dedicated sensor which can be freely positioned along the path followed by the chain 9.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A chain drive comprising:
   a driving sprocket;
   at least one driven sprocket;
   an endless chain wound around said driving and driven sprockets and comprising a plurality of links, each of said links comprising two pivot pins parallel and transversely spaced apart from each other and at least three strips extending between said two pivot pins and having opposite end portions through which said pivot pins pass; and
   means for controlling wear of said chain, said means for controlling wear comprising detector means for detecting the breakage of at least one of said strips and emitter means for sending a signal for replacement of said endless chain in response to a breakage signal received from said detector means, said detector means comprising:
      at least one portion made of electrically insulating material; and
      one detecting metal portion at least partially housed in said portion of electrically insulating material, said detecting metal portion configured to be exposed through the electrically insulating material by repetitive passing of a broken strip of said chain such that electrical contact between the broken strip and the detecting metal portion is made, thereby generating the breakage signal.

2. The chain drive according to claim 1, wherein said portion of electrically insulating material cooperates with friction with said endless chain.

3. The chain drive according to claim 1, wherein said portion of electrically insulating material is arranged in a position spaced away from said endless chain.

4. The chain drive according to claim 1, wherein said portion of electrically insulating material comprises a protective external lateral portion facing said endless chain; said metal portion being arranged on the opposite side of said protective lateral portion with respect to said endless chain.

5. The chain drive according to claim 4, wherein said metal portion comprises at least one elongated body made of metal material extending parallel to said pins and adapted to be at least scratched by said broken strip.

6. The chain drive according to claim 4, wherein said metal portion comprises at least one plate- or grille-like body parallel to said pins and adapted to be at least scratched by said broken strip.

7. The chain drive according to claim 1, wherein it also comprises a tensioner shoe of said endless chain; said detector means being carried by said tensioner shoe.

8. The chain drive according to claim 7, wherein said shoe is at least partly made of electrically insulating material and carries at least partly embedded said detecting metal portion.

9. The chain drive according to claim 1, wherein it also comprises a guide shoe of said endless chain, said detector means being carried by said guide shoe.

10. A shoe for tensioning or guiding an endless chain of an endless chain drive; said chain drive comprising:
an endless chain in turn comprising a plurality of links each said link comprising two pivot pins parallel to, and transversely spaced apart from, each other and at least three strips extending between said two pivot pins and having opposite end portions through which said pivot pins pass;
the shoe comprising an external friction or guide surface for said endless chain and control means for controlling wear of said endless chain said control means for controlling wear comprising detector means at least partly housed in said shoe for detecting breakage of at least one of said strips and electrical cable for connecting said detector means to emitter means of a chain replacement signal, said detector means comprising:
at least one portion made of electrically insulating material; and
one detecting metal portion at least partially housed in said portion of electrically insulating material, said detecting metal portion configured to be exposed through the electrically insulating material by repetitive passing of a broken strip of said chain such that electrical contact between the broken strip and the detecting metal portion is made, thereby generating a breakage signal.

11. A sensor for detecting wear of an endless chain of a chain drive comprising:
a plurality of links and, for each said link, a pair of pivot pins parallel to, and transversely spaced apart from, each other and at least three longitudinal strips;
the sensor comprising a connection body for connection to support means, detector means coupled with said connection body and adapted to detect the breakage of at least one of said strips; and
an electric cable for connecting said detector means to emitter means of a chain replacement signal;
wherein said detector means comprises at least one portion made of electrically insulating material, and one detecting metal portion at least partially housed in said portion of electrically insulating material, said detecting metal portion configured to be exposed through the electrically insulating material by repetitive passing of a broken strip of said chain.

12. The sensor according to claim 11, wherein said portion of metal material comprises at least one elongated portion arranged, in use, parallel to said pivot pins of said endless chain or a metal link.

13. A timing assembly for an internal combustion engine comprising valve means for inflow of a working fluid and valve means for outflow of combustion products and a chain drive for controlling said valve means as claimed in claim 1.

* * * * *